(12) United States Patent
Bajaj et al.

(10) Patent No.: US 10,510,075 B2
(45) Date of Patent: Dec. 17, 2019

(54) SYSTEMS AND METHODS FOR SECURE MOBILE PAYMENTS

(71) Applicant: Fidelity National E-Banking Services, Inc., Jacksonville, FL (US)

(72) Inventors: Hitesh Bajaj, Duluth, GA (US); Douglas G. Brown, Grafton, WI (US); Susan Hawkins, Shorewood, WI (US)

(73) Assignee: FIDELITY NATIONAL E-BANKING SERVICES, INC., Jacksonville, FL (US)

( * ) Notice: Subject to any disclaimer, the term of this patent is extended or adjusted under 35 U.S.C. 154(b) by 1144 days.

(21) Appl. No.: 14/056,493

(22) Filed: Oct. 17, 2013

(65) Prior Publication Data

US 2014/0114855 A1 Apr. 24, 2014

Related U.S. Application Data

(60) Provisional application No. 61/715,926, filed on Oct. 19, 2012.

(51) Int. Cl.
*H04L 29/08* (2006.01)
*G06Q 20/40* (2012.01)
(Continued)

(52) U.S. Cl.
CPC ............ *G06Q 20/40* (2013.01); *G06Q 20/20* (2013.01); *G06Q 20/32* (2013.01); *G06Q 20/3274* (2013.01); *G06Q 20/4012* (2013.01)

(58) Field of Classification Search
CPC ....... G06Q 20/10; G06Q 20/20; G06Q 20/202
(Continued)

(56) References Cited

U.S. PATENT DOCUMENTS

| 2008/0040274 A1 | 2/2008 | Uzo |
| 2008/0065554 A1 | 3/2008 | Hogan et al. |

(Continued)

OTHER PUBLICATIONS

Secure mobile commuication in m-payment system using NFC technology. T. Ali, M. Abdul Awal. 2012 International Conference in Informatics, Electronics & Vision. May 18, 2012. (Year: 2012).*

(Continued)

*Primary Examiner* — Alexander G Kalinowski
*Assistant Examiner* — John O Preston
(74) *Attorney, Agent, or Firm* — Finnegan, Henderson, Farabow, Garrett & Dunner LLP

(57) ABSTRACT

Systems and methods are provided that enable purchase and adjustment transactions using a visual indicium displayed on a mobile device. In some embodiments, these indicia are in the form of bar codes, include alias information, and do not include an account number associated with a payment account. A mobile device receives first user input, displays the indicium to a merchant device. The merchant device scans the indicium and sends a transaction request including the alias information to a payment network. The payment network determines an appropriate financial institution for processing the transaction, and sends the transaction request to the appropriate financial institution. Based on the result, the payment network sends an approval to the merchant device. Additionally, a mobile processor system sends new alias information to the mobile device for use in a next transaction.

7 Claims, 9 Drawing Sheets

(51) Int. Cl.
  *G06Q 20/20* (2012.01)
  *G06Q 20/32* (2012.01)
(58) Field of Classification Search
  USPC .......................................................... 705/39
  See application file for complete search history.

(56) References Cited

U.S. PATENT DOCUMENTS

| | | | |
|---|---|---|---|
| 2008/0167017 A1* | 7/2008 | Wentker | G06Q 20/10 |
| | | | 455/414.1 |
| 2010/0138344 A1 | 6/2010 | Wong et al. | |
| 2011/0143711 A1* | 6/2011 | Hirson | G06Q 20/32 |
| | | | 455/410 |
| 2012/0028609 A1* | 2/2012 | Hruska | G06Q 20/3674 |
| | | | 455/411 |
| 2012/0054046 A1 | 3/2012 | Albisu | |
| 2012/0136739 A1 | 5/2012 | Chung | |

OTHER PUBLICATIONS

A Survey on Near Field Communication (NFC) Technology. Vedat Coskun, Busra Ozdenizci, and Kerem OK. Wireless Personal Communications. Aug. 2013, vol. 71, Issue 3, pp. 2259-2294. (Year: 2013).*
Near Field Communication. Vibhor Sharma, Preeti Gusain, and Prashant Kumar. Proceedings of the Conference of Advances in Communication and Control Systems. Apr. 1, 2013. Atlantic Press. (Year: 2013).*
International Search Report for International Application No. PCT/US13/65629, dated Feb. 21, 2014 (2 pages).
Written Opinion of the International Searching Authority and Search History for International Application No. PCT/US13/65629, dated Feb. 21, 2014 (20 pages).

* cited by examiner

SYSTEMS AND METHODS FOR SECURE MOBILE PAYMENTS

RELATED APPLICATIONS

This application claims priority to U.S. Provisional Application No. 61/715,926, filed Oct. 19, 2012. This application is hereby incorporated by reference in the present application.

TECHNICAL FIELD

The disclosed embodiments are useful for enabling payments using mobile devices.

BACKGROUND

Bar codes and other types of visual indicia can be used to facilitate transactions of various kinds. For example, coupons use bar codes to represent consumer promotions, discounts, or free items. Bar codes are also used to identify products on a unique or non-unique basis (for example, as a Universal Product Code or UPC), which allows for quick identification of products at a point of sale. Bar codes have also been used for other types of transactions. For example, bar codes can be used to authenticate concert tickets, gift cards, or returns (e.g., with a bar code printed on a receipt).

Recently, digital bar codes have been incorporated into mobile applications that permit customers to redeem limited items such as gift cards, loyalty cards, coupons, boarding passes, and tickets, by displaying a bar code associated with the customer on the display of the mobile device. However, such indicia, alone, generally provide little to no security. For example, bar codes can easily be copied and used without the permission of the person who legally possesses the bar code. This causes loss for the possessor because it can be associated with something of value like a gift card, discount, or loyalty reward. If another person is able to copy the bar code, the other person can redeem that value against the wishes of the rightful owner. Due to this lack of security and other deficiencies, existing bar code-enabled applications and their underlying systems and methods are ill-suited for adaptation to high-risk payment transactions, including those that involve funds in a user's financial account, such as a credit or debit card a customer may use at a traditional point of sale.

Thus, a solution enhancing the security of mobile payments is needed.

SUMMARY

Disclosed embodiments enable users to utilize payment accounts in a secure manner. In some embodiments, disclosed embodiments enable a mobile device to receive first alias information representing an account, present the alias information in a form of visual indicia to perform a purchase transaction, and receive second alias information representing that account.

The disclosure provides a method for effecting a payment transaction using a mobile device. The method includes receiving, by the mobile device, a first user input to initiate a first payment transaction. For example, this input may comprise an actuation of a touchscreen. In response to the first user input, the device presents on a display of the mobile device, to a merchant device, first alias information to initiate a first payment transaction associated with at least one account. The first alias information is associated with at least one account. The method further comprises receiving, over a network, an indication of approval of the first payment transaction, and second alias information. The second alias information is different from the first alias information and in some embodiments may be used for a subsequent transaction. The disclosure also provides a mobile device for effecting a payment transaction. The mobile device includes a display, a processor system comprising one or more processors, and a storage device containing instructions. The instructions are configured to cause the processor system to perform the above method.

The disclosure also provides a method for processing a payment transaction on a computer system. The method includes receiving, from a merchant device, a first transaction comprising transaction information and first alias information. The first alias information is associated with at least one account, such as a bank account. The method further comprises determining, using a database, account information associated with the first alias information. The account information comprises at least an identifier of the account and a financial institution associated with the account. The method further comprises sending a transaction request to the determined financial institution. The transaction request comprises at least an identifier of the account and an identifier of the financial institution, and responsive thereto, receiving a response to the transaction request. The method further comprises forwarding the response to the merchant device, receiving second alias information from another device, and marking the first alias information as used in the database. The disclosure also illustrates a computer system for processing a payment transaction. The mobile device includes a processor system comprising one or more processors and a storage device containing instructions. The instructions are configured to cause the processor system to perform the above method.

The disclosure also provides a method for effecting a payment transaction at a merchant device. The method comprises reading, from a mobile device, first alias information. The first alias information may be displayed on a display of the mobile device and may be associated with an account. The method further comprises determining that the first alias information indicates a payment network for processing the first payment transaction, and sending a request to the payment network to process a first payment transaction. The request comprises the first alias information and information about the first payment transaction. The method further comprises receiving a communication indicating one of approval or disapproval of the payment transaction. The disclosure also illustrates a system for effecting a payment transaction on a system. (This system may be a merchant device such as a point-of-sale or cash register device.) The system includes a processor system comprising one or more processors and a storage device containing instructions. The instructions are configured to cause the processor system to perform the above method.

Embodiments consistent with the present disclosure include computer-implemented methods, tangible non-transitory computer-readable mediums, and computer-implemented systems. Computer-implemented methods consistent with the present disclosure may be executed, for example, by one or more processors that receive instructions from at least one non-transitory computer-readable storage medium. Similarly, systems consistent with the present disclosure may include at least one processor and at least one memory device (such as a non-transitory computer-readable storage medium).

As used herein, a non-transitory computer-readable storage medium refers to any type of physical memory on which information or data readable by a processor may be stored. Examples include random access memory (RAM), read-only memory (ROM), volatile memory, nonvolatile memory, hard drives, CD ROMs, DVDs, flash drives, disks, and any other known physical storage media.

Consistent with the present disclosure, the term "computer system" refers to one or more electronic computers, and the term "processor system" refers to one or more electronic processors.

Consistent with the present disclosure, memory devices may comprise any type of computer-readable storage medium, unless otherwise specified. A computer-readable storage medium may store instructions for execution by at least one processor, including instructions for causing the processor to perform steps or stages consistent with the embodiments described herein. Additionally, one or more computer-readable storage media may be utilized in implementing embodiments consistent with the present disclosure. The term "computer-readable storage medium" should be understood to include tangible media and exclude carrier waves and transient signals.

It is to be understood that both the foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments, and serve to explain some principles of the embodiments.

DETAILED DESCRIPTION

Reference will now be made in detail to various embodiments, examples of which are illustrated in the accompanying drawings. Wherever possible, the same reference number will be used throughout the drawings to refer to the same or like parts.

Disclosed embodiments enable, for example, the creation of alias information associated with account information. Alias information may be displayed on a mobile device, in the vicinity of (or otherwise delivered to) a payment terminal in the place of a typical payment account number. In some embodiments, alias information may be in the form of a Primary Account Number (PAN) that resembles a payment card number. The alias information may also be in the form of a number, an alphanumeric identifier, a string of letters, or other identifier, useful for processing transactions. In some embodiments, after processing a first transaction, a remote device may generate and send new alias information to the mobile device for use in a second transaction. The remote device may deny future purchase transactions that use the used alias information. Adjustment transactions, such as returns, refunds, or price adjustments may, in some embodiments, be accomplished using either the new alias information or used alias information associated with an earlier transaction.

Figure 1:
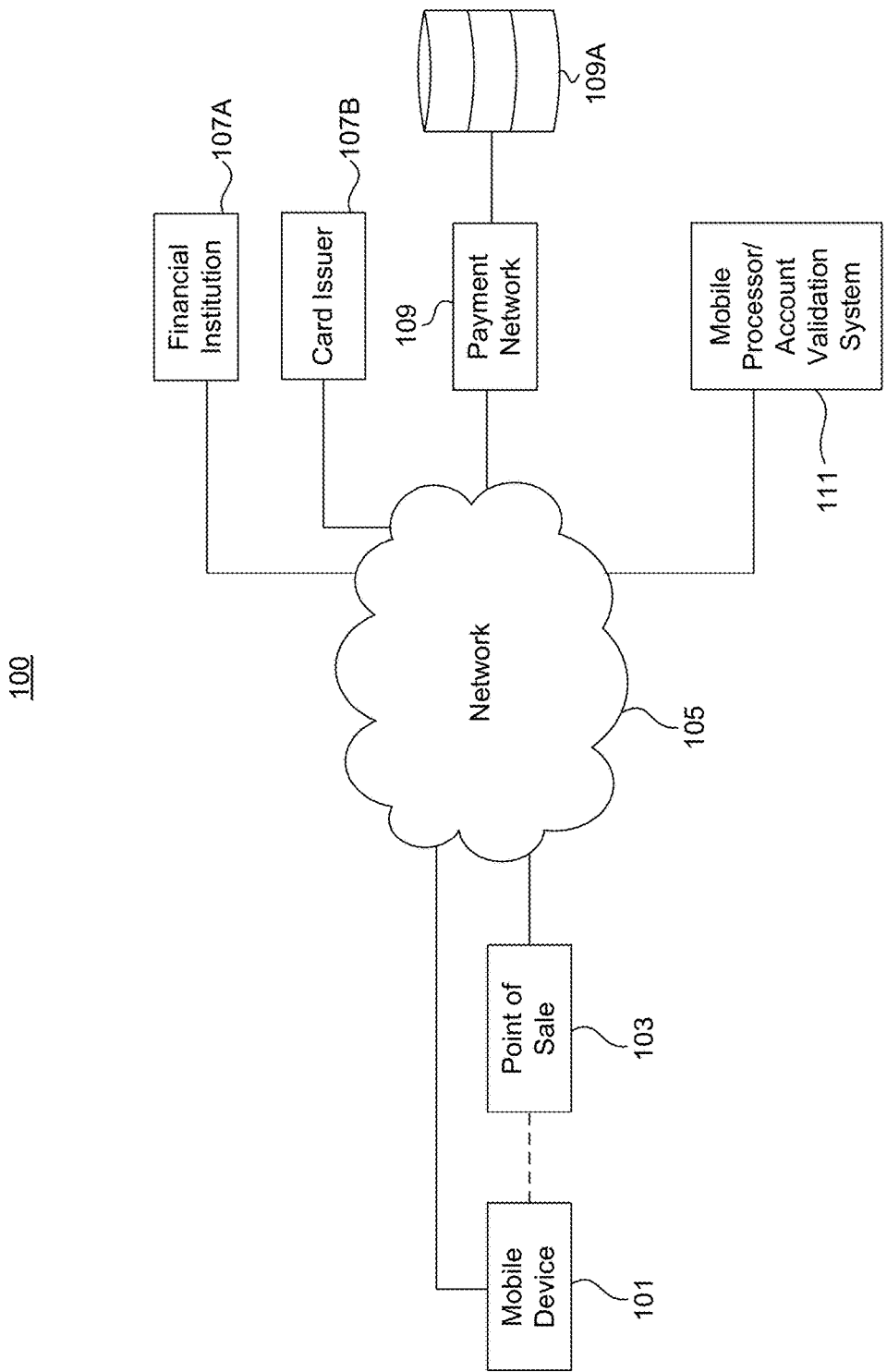
FIG. 1 depicts an example network layout, for implementing embodiments consistent with this disclosure.

FIG. 1 depicts an exemplary network layout 100, for implementing embodiments consistent with this disclosure. Layout 100 includes a mobile device 101, a point-of-sale device (POS) 103, a financial institution 107A, a card issuer 107B, a payment network 109, a database 109A, and a mobile processor/account validation system 111, as well as a network 105, useful for implementing disclosed embodiments. While the blocks in FIG. 1 are present in singular form, in some embodiments, devices represented by the blocks may be consolidated, duplicated, omitted, or otherwise modified from the particular arrangement in this exemplary figure.

Mobile device 101 may be implemented as a cellular phone, a portable electronic device, a personal digital assistant (PDA), a personal music player (PMP), or any other electronic device that may output information by displaying information on a display. Mobile device 101 is connected to a network such as network 105. This connection can be accomplished by, for example, a WI-FI or other wireless connection, a cellular connection, a satellite connection, a Bluetooth connection, or any other type of wired or wireless network connection. Additionally, in some embodiments, mobile device 101 need not have a continuous connection to network 105. Mobile device 101 may communicate with POS 103. In some embodiments, mobile device 101 may display alias information in the form of a visual indicium, such as a bar code, that may be received and interpreted by POS 103.

POS 103 may be implemented as a cash register, a kiosk, a stand-alone payment device, a computer with specialized or general-purpose software, or the like. POS 103 may also be referred to more generally as a "merchant device," and may enable a consumer (operating, for example, mobile device 101) to make a purchase of a good or service from a merchant (operating, for example, POS 103). POS 103, in some embodiments, may include or be in communication with a camera, bar code scanner, or other optical sensing device. Such an optical sensing device can enable POS 103 to receive information from mobile device 101.

POS 103 may be connected to network 105 through a variety of connections, for example, a dial-up connection, an always-on wired connection (e.g., DSL, Cable, fiber-optic, ISDN, or the like), a wireless connection (e.g., cellular, satellite, WIMAX), or any other type of network connection. POS 103 may, in some embodiments, be operated by a consumer alone, such as in embodiments where POS 103 is a stand-alone kiosk. However, in some embodiments, POS 103 may be operated by a person other than the consumer (for example, a cashier or vendor) to assist in accomplishing the transaction.

Network 105 may be any type of network, for example, the Internet, an Intranet, a LAN, a WAN, a cellular network, a satellite network, a wireless network, a wired network, the Plain Old Telephone System (POTS), or any other type of network. Network 105 may also comprise, in some embodiments, multiple networks. For example, while some devices in FIG. 1 may communicate using one network (such as a LAN or WAN), another set of devices may communicate using a different network (such as a cellular network). Both sets of devices can also communicate with each other through network 105. This can be accomplished with an intermediary device such as a network bridge (a device that links two types of networks and allows communication between them).

Financial institution 107A may be a bank that holds an account controlled by a consumer using mobile device 101. (A consumer is said to "control" an account by virtue of owning the account, having access to the account, having the ability to make purchases or sign checks against the balance of the account, or having another relationship with the account.) Such accounts may include, for example, deposit accounts, checking accounts, savings accounts, money market accounts, certificates of deposit, lines of credit, credit card accounts, or the like. In some embodiments, financial institution 107A could be a credit union, a regional bank, a depository institution, an investment bank, a retail bank, a commercial bank, an online-only bank, a savings-and-loan association, or the like.

Card issuer 107B may be an entity that issues credit accounts and/or associated branding. Branding of credit accounts includes, for example, identifiers which represent a group that the card is part of (such as "VISA" or "MASTERCARD"). For example, card issuer 107B may provide a credit account (including a number and, optionally, a plastic card) to a consumer, as well as provide the branding for that account. As another example, financial institution 107A may provide the account itself while card issuer 107B provides the branding and network that enables the account to be used as payment at a wide variety of merchants. One of ordinary skill will understand that other variants are possible as well. Card issuer 107B may be, in conjunction with payment network 109, responsible for routing payment requests, facilitating transactions, or the like.

Payment network 109 may be, in some embodiments, one or more devices that enable transmission of payment (or other) transaction information between its "members." An entity, such as a bank, card issuer, or other financial institution, may be a member of payment network 109 if it has a contract or other agreement that enables direct communication between payment network 109 and that entity.

For example, in some embodiments, payment network 109 is an interbank network (such as the NYCE™ network). Payment network 109 routes requests from POS 103 to destination entities such as financial institution 107A, card issuer 107B, or another payment network that should receive the requests. Payment network 109 routes these requests by determining information enclosed in the requests. In situations where a particular destination entity is not a member, payment network 109 may communicate with that destination entity by sending and receiving transactions through another payment network or similar system.

Payment network 109 may be connected to a database 109A. Database 109A may store, for example, alias information representing an account (and not necessarily containing an account number of the account) held by financial institution 107A or card issuer 107B, a Personal Identification Number (PIN) chosen by a consumer using mobile device 101, account information for an account held by financial institution 107A or card issuer 1078 (such as a routing number, account number, or card number), or the like. Database 109A may store the above information in a one-to-one association with one another. For example, database 109A can contain, for each individual item of alias information, an associated PIN and associated account information. This enables payment network 109 to determine the appropriate account to debit or credit when mobile processor/account validation system 111 sends an alias PAN and associated PIN. Database 109A may also store sequence numbers and verification amounts used for verifying ownership of an account.

Mobile processor/account validation system 111 may be implemented as an electronic device configured to communicate with mobile device 101, POS 103, network 105, financial institution 107A, card issuer 107B, or payment network 109. Mobile processor/account validation system 111 enables a transaction received from payment network 109 or POS 103 to be properly routed to the correct account. Mobile processor/account validation system 111 is configured to generate alias information for displaying in the form of a visual indicium.

In some embodiments, mobile processor/account validation system 111 may be implemented as a single electronic device. However, in other embodiments, mobile processor/account validation system 111 may be implemented as multiple interconnected electronic devices. Mobile processor/account validation system 111 may also implement a website usable by a consumer that uses mobile device 101. Such a website may provide functionality for enabling that consumer to interact with the system, such as signing up for a consumer account that grants access to disclosed functionality, associating mobile device 101 with a consumer account, changing usernames or passwords, associating mobile device 101 with financial institution accounts or card accounts, establishing or changing PINs associated with an account or mobile device 101, verifying ownership of accounts, changing or adding a contact email address, or the like.

Figure 2:
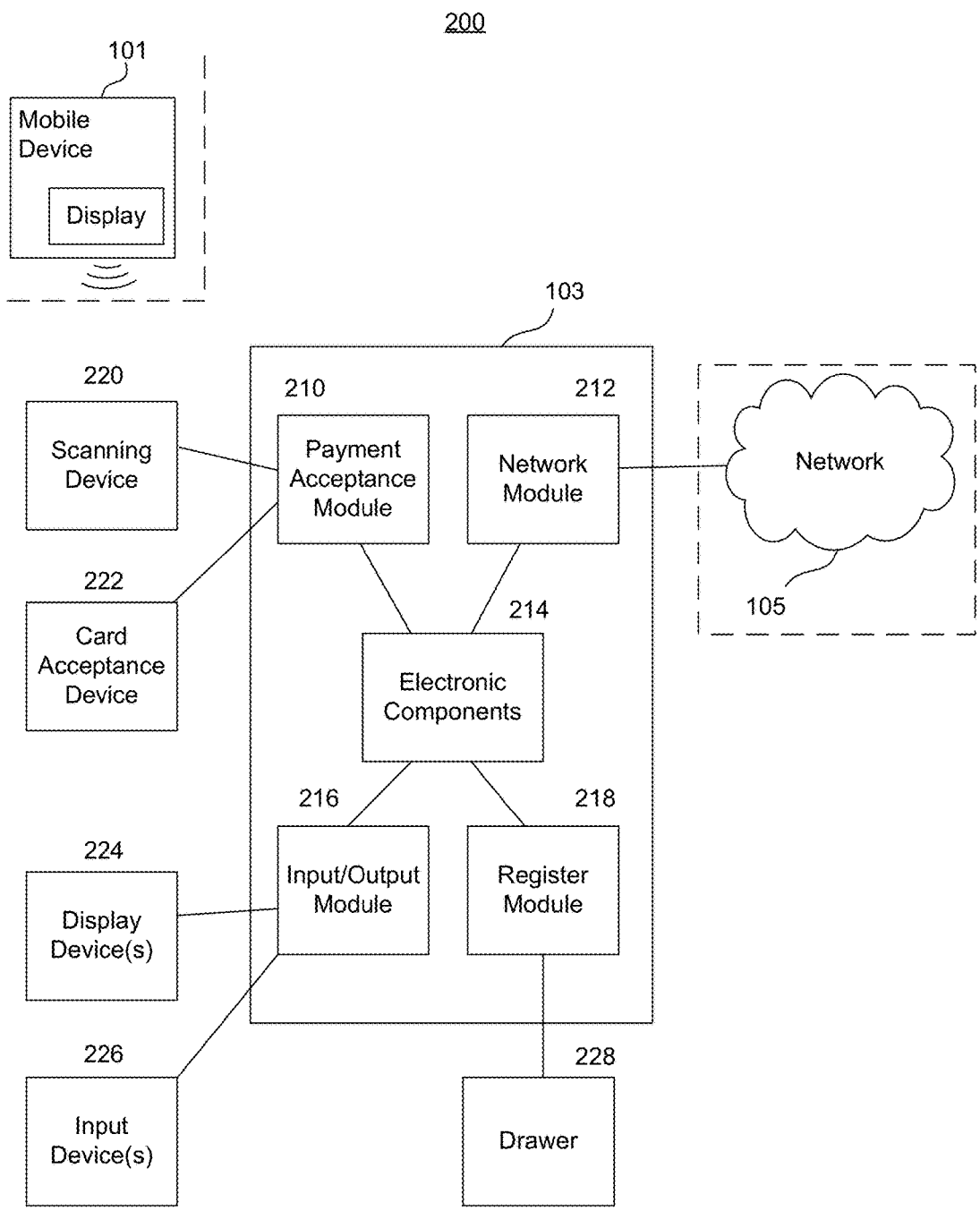
FIG. 2 is an example diagram of associated devices, including point-of-sale device, for implementing embodiments consistent with this disclosure.

FIG. 2 shows exemplary modules of POS 103 and exemplary connections that POS 103 may use for communicating with mobile device 101 and network 105. POS 103 includes a payment acceptance module 210, a network module 212, an input/output module 216, and a register module 218. Each of these may be implemented as software, hardware, firmware, or a combination of any of those. POS 103 also includes electronic components 214. Electronic components 214 include devices and components that enable communication between the above-mentioned modules in POS 103. In addition, the modules shown in FIG. 2 may, in some embodiments, be present in singular form, may be duplicated, or may be omitted. Further, POS 103 may be connected through some of these modules to a variety of devices, such as a scanning device 220, a card acceptance device 222, a display device 224, an input device 226, and a cash drawer 228. POS 103 may be connected to these external devices through wired or wireless means.

Payment acceptance module 210 is configured to accept payment information for transactions. For example, payment acceptance module 210 may accept information concerning a payment account (e.g., by use of a card or optically recognized, i.e., scanned, information). Payment acceptance module 210 may be connected to a variety of other devices and modules. For example, payment acceptance module 210 may be connected (in a wired, wireless, or other form) to at least one of a scanning device 220 or a card acceptance device 222.

Scanning device 220 is configured to read/receive visible information, such as text, pictures, bar codes, images, or the like. In some embodiments, scanning device 220 may implemented as a bar code reader, a camera, a scanner, or any other optical sensing device for capturing a printed or rendered image, bar code, or other visual indicium. Scanning device 220 may further process the displayed indicium to isolate or otherwise recognize data encoded within the captured image, barcode, or other display information. Alternatively, the recognition of data encoded within the captured display information may be performed by another processor within POS 103 or communicatively coupled thereto. Mobile device 101 may render a visible indicium (e.g., a bar code) on a display of mobile device 101, allowing scanning device 220 to determine the content of the visible information and to deliver it to payment acceptance module 210. In some embodiments, scanning device 220 may also scan UPCs or other printed identifiers in order to determine the price of items that a consumer wishes to purchase. In some embodiments, scanning device 220 may work in conjunction with a register module 218 to scan items for purchase, determine the price for each item, and add the total price for the transaction.

Card acceptance device 222 may be implemented as a magnetic stripe scanner, RFID, or contactless smart card device, for reading credit, debit, payment, or other types of cards. Card acceptance device 222 could be implemented as an external device (i.e., separate from POS 103 and connected via a cable or other means), as a device physically attached to POS 103 (i.e., physically attached to POS 103), or the like.

Network module 212 may be implemented as a hardware device configured to enable connection to network 105. For example, network 105 may be the Internet, an Intranet, a LAN, a WAN, a cellular network, a satellite network, a wireless network, a wired network, the Plain Old Telephone System (POTS), or any other type of network. Network module 212 may be implemented as an adapter operable to connect to network 105, in whatever form that network is. For example, network module 212 may be a fiber-optic networking adapter, a modem, an Ethernet adapter, a wireless adapter (such as WI-FI, cellular, or satellite), or the like.

Input/output module 216 is configured to enable input of data, such as keyed data or scanned data, as well as output of data, such as price, product, purchase, or consumer information. For example, input/output module 216 may be connected to display device 224. Display device 224 may include, for example, a computer monitor, a pole display, an LED/LCD price display, a receipt printer, or any other device or module enabling communication of information to a consumer or a cashier/attendant. Input/output module may also be connected to input device 226. Input device 226 may include, for example, a keyboard, a keypad, a touchscreen device, a bar code scanner or other device operable to scan visible information, a magnetic stripe reader, or the like.

Register module 218 may be implemented in hardware or software configured to enable transactions to be accomplished with POS 103. In some embodiments, register module 218 may be operable to receive information from other modules (e.g., input/output module 216 or payment acceptance module 210) in order to determine the items that a consumer wishes to purchase, as well as the cost associated with each item. Register module 218 may also be connected to drawer 228, enabling a cashier to receive and store cash or check payments. Drawer 228, as will be recognized by one of skill in the art, may enable secure storage of funds.

Each of the modules and devices in FIG. 2 may be configured to receive information from one another. For example, in some embodiments, register module 218 is configured to receive information concerning items that a consumer wishes to purchase from input device 226 and/or scanning device 220, create a running total of items for purchase, receive payment information from payment acceptance module 210, communicate with a remote device over network 105 using network module 212, and subtract the amount paid from a running total in order to fill the transaction.

Figure 3:
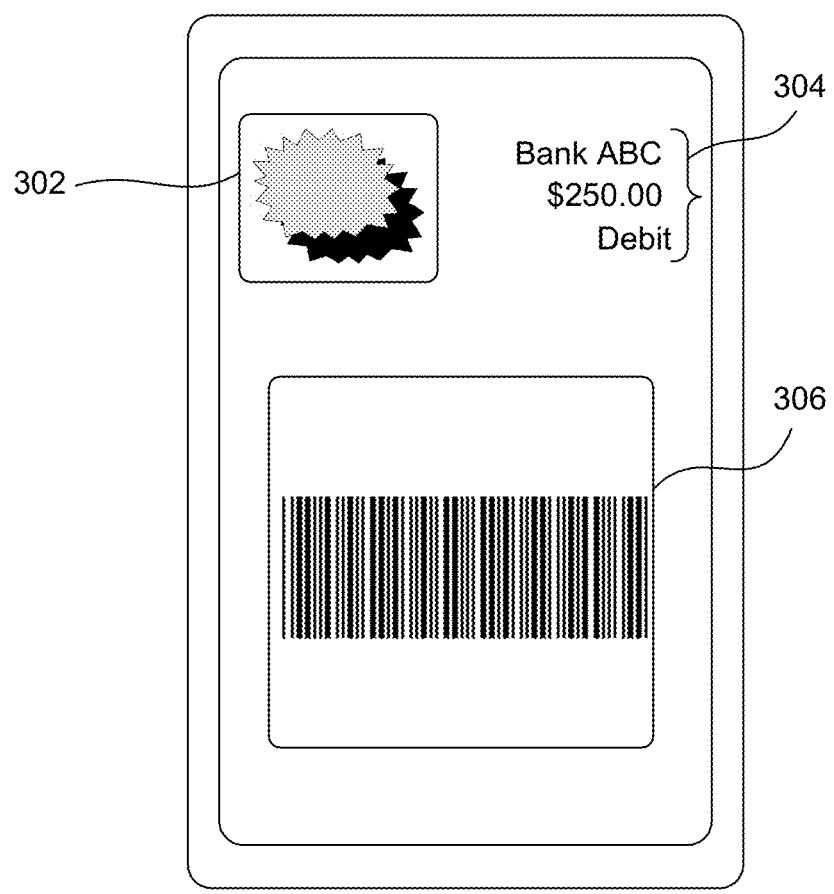
FIG. 3 depicts an example graphical layout, for implementing embodiments consistent with this disclosure.

FIG. 3 illustrates exemplary details of mobile device 101, usable for effecting payment transaction requests using accounts. Mobile device 101 comprises a display for displaying information. The information includes, for example, a card icon/logo 302, account information 304, and a bar code display 306. While FIG. 3 does not depict mobile device 101 as having physical keys, mobile device 101, in some embodiments, may include physical keys, a touchscreen, or any other type of input device.

Card icon/logo 302 may comprise an image of a card associated with an account. The account may be, for example, a checking account, a savings account, a credit account, a charge account, a gift card account, or the like. In some embodiments, if an image of a card is not available (for example, because the account does not have a card associated with it), another logo (such as a logo associated with a bank or card issuer, a user-chosen logo, or another logo) may be used.

Account information 304 includes information associated with the account. In some embodiments, account information 304 may include one or more of a bank/issuer name, a balance on the account (for example, an amount of money in a deposit account, an amount of money remaining on a line of credit, or a current balance on a charge account), or information about the account (for example, the last few digits of the account, the name of the account, any special features of the account such as points or discount information, or the like). Other information may be displayed as part of account information 304, as one of ordinary skill will understand.

In some embodiments, bar code display 306 may display a bar code representing the account. As mentioned previously, the information displayed on mobile device 101 may be displayed in view of POS 103. POS 103 can then read the information displayed on mobile device 101, using a scanner, camera, or other optical sensing device.

The information displayed on bar code display 306 may be "alias" information associated with a payment account. In some embodiments, for security or other reasons, the alias information does not include a number of the account itself. Rather, the alias information may be used to identify the payment account in conjunction with a remote system (such as payment network 109).

The alias information may also include Track 1/Track 2 data. Track 1 data includes data elements that would normally be present on a standard magnetic-stripe card (such as a credit card or debit card). When using a standard credit card to effect a transaction at a merchant, the merchant may swipe the credit card through a magnetic stripe reader and receive information about the card, cardholder, and account, in order to process the transaction. In some embodiments, Track 1 information in the alias information includes, for example, an alias number, a country code, a name associated with the account, an expiration date, a redundancy/check character, or the like, but does not include an account number. The alias information may be referred to herein as an "alias PAN," because it may be formed to resemble a Primary Account Number (PAN). A PAN may be from 13 to 19 digits long. In some embodiments, the alias PAN has '59' as the first two digits, but other values are possible.

Track 2 data includes some or all of the same information as the Track 1 data. Additionally, Track 2 data may include other information, for example, service codes, Card Verification Values (CVV), Card Verification Codes (CVC), other verification codes, or the like. Track 2 data, in some embodiments, may enable "card present" transactions to take place at POS 103, even though no card is present.

In some embodiments, the alias information may be presented on display area 306 in the form of a one-dimensional bar code. In other embodiments, the alias information may be presented on display area 306 in any other visual form. For example, the alias information can be presented as a two-dimensional bar code, a color bar code, a UPC-A bar code, an EAN-13 bar code, a Code 93 bar code, a PDF417 bar code, a Data Matrix 2D bar code, a High Capacity Color Barcode (HCCB), a Quick Response (QR) code, a picture, an image, or the like. One of skill in the art will recognize that there are multiple forms for this alias information, and that equivalents are also possible.

FIGS. 4A-4E illustrate various transactions that can be effected by a consumer using mobile device 101. While the illustrated processes in FIGS. 4A-4E indicate that mobile device 101 performs various steps, in some embodiments, various steps may alternatively or additionally be performed by a consumer logged into a web site, such as a web site operated by mobile processor/account validation system 111.

Figure 4A:
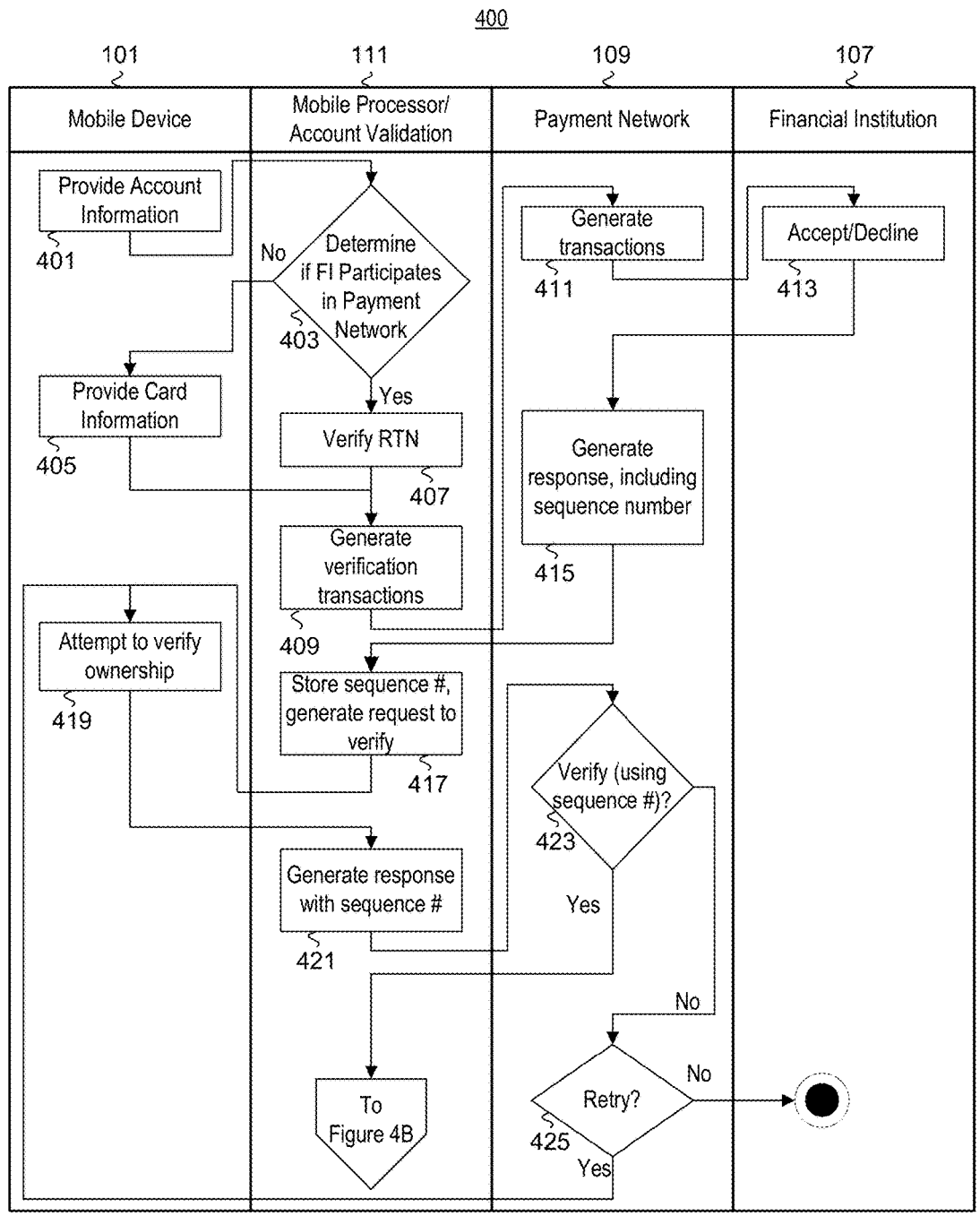
FIGS. 4A and 4B illustrate an example process flow for associating a financial institution account with a mobile device, useful for implementing embodiments consistent with this disclosure.
Figure 4B:
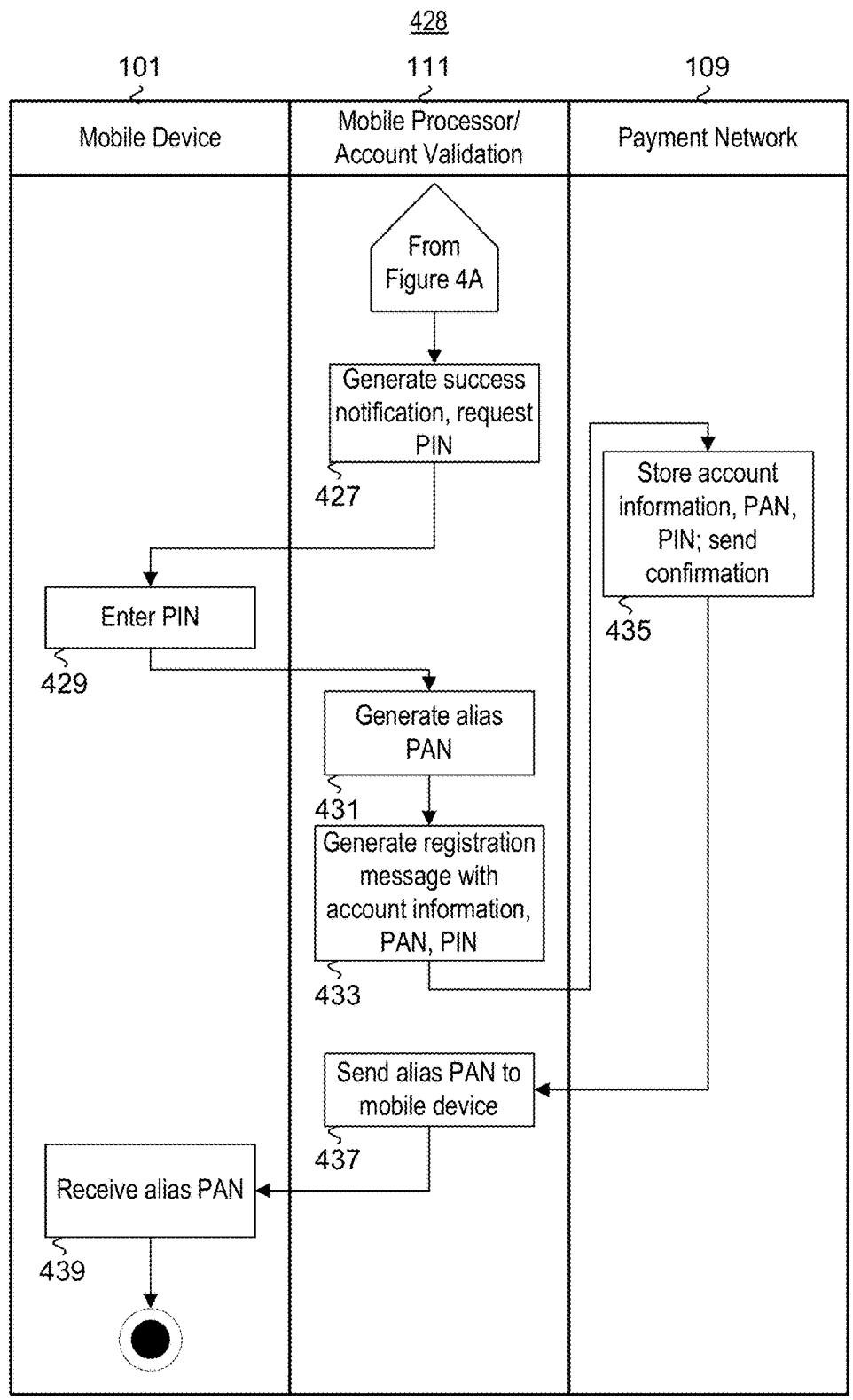

FIGS. 4A and 4B illustrate an example process flow for associating a financial institution account with a mobile device, useful for implementing embodiments consistent with this disclosure. FIG. 4A and FIG. 4B are intended to be read as two portions of the same process.

Process 400 in FIG. 4A begins at step 401. In step 401, a consumer may utilize mobile device 101 to generate a registration message, and send that message to mobile processor/account validation system 111. The registration message includes information to associate mobile device 101 with an account owned or otherwise controlled by that consumer and held at financial institution 107. For example, the registration message includes an account number of the account, a Routing Transit Number (RTN) associated with the account (also known as an "ABA number" or "routing number"), or another identifier of the account. The registration message may also include a customer ID associated with the consumer. In some embodiments, this customer ID may be a customer ID used by a consumer to log into a web site (such as a web site operated by mobile processor/account validation system 111). Mobile device 101 then sends that registration message to mobile processor/account validation system 111.

In step 403, mobile processor/account validation system 111 receives the registration message and determines whether financial institution 107 participates in payment network 109. As explained above, payment network 109 may be implemented as one or more devices that receive and send transactions from participants of payment network 109. Mobile processor/account validation system 111 may determine that financial institution 107 participates in payment network 109 if the two entities have a contract or business relationship with one another. Such a relationship or contract could, for example, enable payment network to receive transactions from financial institution 107 without having to receive them from another payment network or another entity If, in step 403, mobile processor/account validation system 111 determines that financial institution 107 does not participate in payment network 109, mobile processor/account validation system 111 may send a message to mobile device 101 requesting a card number associated with the account. For example, mobile processor/account validation system 111 may send a message requesting an associated debit card number (e.g., the card number printed on a debit card associated with the account). If, however, in step 403, mobile processor/account validation system 111 determines that financial institution 107 participates in payment network 109, process 400 moves to step 407, where the RTN received from mobile device 101 is verified (e.g., to determine that it identifies a participant in payment network 109, that it is of the correct length, or the like).

In step 409, mobile processor/account validation system 111 generates and sends at least one verification transaction. In some embodiments, a verification transaction is a debit or credit of a small value (e.g., less than ten cents each) used to verify that the consumer attempting to associate an account with mobile device 101 has access to that account. Verification transactions also include a Routing Transit Number (RTN) of the account, an identifier of the account, and an identifier of financial institution 107, to enable the verification transactions to be credited or debited into the appropriate account. Mobile processor/account validation system 111 may then send the at least one verification transaction to payment network 109 for sending to financial institution 107.

In step 411, payment network 109 generates and sends payment transactions based on the received at least one verification transaction. The type of transaction generated may depend on the particular type of account. For example, if financial institution 107 does not participate in payment network 109, then the account may have a debit card associated therewith. Payment network 109 may then generate a debit card-based payment transaction for sending the at least one verification transaction to financial institution 107. In some embodiments, such a transaction may be sent through card issuer 107B (if the account has an associated debit card) or through another payment network.

If, on the other hand, financial institution 107 participates in payment network 109, then payment network 109 generates a payment transaction that utilizes account information (such as an RTN and account number). In step 413, financial institution 107 receives the payment transaction and attempts to credit or debit the account as appropriate. Financial institution 107 then returns a response to payment network 109 indicating whether the payment transaction was successful.

In step 415, payment network 109 receives the response from financial institution 107. If the payment transaction was unsuccessful, payment network 109 may return a message (not pictured) to mobile device 101 and/or mobile processor/account validation system 111 indicating that the transaction was unsuccessful. However, if the payment transaction was successful, payment network generates a response for sending to mobile processor/account validation system 111. In some embodiments, this response includes a sequence number that associates the at least one verification transaction with the process of verifying the account ownership. This sequence number enables lookup of the account that the consumer wishes to associate with mobile device 101, and may be stored (e.g., in a database) along with each of the values of the at least one verification transactions. Payment network 109 then sends this response to mobile processor/account validation system 111.

In step 417, mobile processor/account validation system 111 receives the response and stores the sequence number included therein. Mobile processor/account validation system 111 then generates a request to verify the at least one verification transaction and sends the request to mobile device 101. The purpose of the request is to verify that the consumer operating mobile device 101 has control over the account that he is trying to associate with mobile device 101.

In step 419, mobile device 101 receives the request to verify the at least one verification transaction. The consumer can then determine the value for each of the at least one verification transaction (for example, using a website operated by financial institution 107 providing online banking services, using a paper statement issued by financial institution 107, or using an automated telephone banking system operated by financial institution 107) and can input those values into mobile device 101. In some embodiments, if more than one verification transaction was processed, the consumer may have to input the value of each verification transaction individually; however in other embodiments, the consumer may only be required to enter the aggregate of the verification transactions. In either case, mobile device 101 then sends back a response with the values corresponding to each of the at least one verification transactions.

In step 421, mobile processor/account validation system 111 receives the response including the values associated with each of the at least one verification transactions. Mobile processor/account validation system 111 may determine the account associated with the response and determines the sequence number associated with that account. Mobile processor/account validation system 111 then generates a request to verify the account. The request includes the sequence number and the values associated with each of the at least one verification transactions. Mobile processor/account validation system 111 then sends the request to verify the account to payment network 109.

In step 423, payment network 109 receives the request and determines whether the values associated with each of the at least one verification transaction are correct. For example, payment network 109 may determine whether the sequence number received in the request exists in a database storing sequence numbers (such as database 109A). If so, payment network 109 may consult that database to determine the values associated with each of the at least one verification transaction, and may determine whether the values in the received request match the values corresponding to each of the at least one verification transaction. If not, the process continues to step 425, where a decision is made as to whether to retry the verification process. This may be based on, for example, a rule defining a maximum number of consumer attempts to verify the amounts in the at least one verification transaction. If the consumer has failed to verify the amounts a certain number of times, the process may end. Otherwise the process may continue back to step 419, where the consumer is be given another chance to correctly enter the verification transactions.

However, if payment network 109 determines that the consumer correctly entered the verification amounts, the process may continue to step 427 in FIG. 4B. In step 427, mobile processor/account validation system 111 may generate a notification that the consumer correctly entered the amounts associated with each of the at least one verification transactions, and that the account has been validated for use by mobile device 111. The notification may also include a request for a Personal Identification Number (PIN). In some embodiments, the requested PIN would be different from a PIN otherwise associated with the account. For example, the PIN requested in step 427 need not be the same as a PIN associated with a debit or other payment card associated with the account.

In step 429, the consumer may use mobile device 101 to provide a PIN for use with the account. For example, the consumer may input the PIN on a keypad associated with mobile device 101. Mobile device 101 may then send the PIN back to mobile processor/account validation system 111 and the process continues to step 431.

Not all embodiments require the use of a PIN, however. For example, in certain embodiments, if the consumer attempts to associate a debit card with mobile device 101, no PIN is requested from the consumer in step 427, and the process continues to step 431.

In step 431, mobile processor/account validation system 111 receives the PIN from mobile device 101. In response, mobile processor/account validation system 111 may generate a new alias Primary Account Number (PAN). This PAN may be generated as a random or pseudorandom number, and may be from 13 to 19 digits long. In some embodiments, the PAN may be generated such that the first two digits are '59,' but other values are possible.

In step 433, mobile processor/account validation system 111 generates a registration message for sending to payment network 109. The registration message includes the alias PAN generated in step 431, the PIN provided in step 429, and account information corresponding to the account at financial institution 107, such as an RTN/account number pair or a debit card number. Mobile processor/account validation system 111 then sends this registration message to payment network 109.

In step 435, payment network 109 receives the registration message. Payment network 109 then stores the received account information, PAN, and PIN in a database accessible to payment network 109, and associates each of them with one another. This enables processing of transactions that include the PAN and PIN, because it enables payment network 109 to determine the appropriate account information for generating a payment transaction. Payment network 109 then sends a message to mobile processor/account validation system 111 indicating that the PAN, PIN, and account information have been stored.

In step 437, mobile processor/account validation system 111 receives the message that the alias PAN, PIN, and account information have been stored in a database accessible to payment network 109. Mobile processor/account validation system 111 then sends the generated alias PAN to mobile device 101.

In step 439, mobile device 101 receives the alias PAN for use in initiating payment transactions. As explained above with reference to FIG. 3, mobile device 101 may represent the received alias PAN in the form of a visual indicium such as a bar code. In other embodiments, mobile processor/account validation system 111 may send the alias PAN in the form of a particular visual indicium. For example, mobile processor/account validation system 111 may send the alias PAN to mobile device 101 as an image file representing a bar code, and mobile device 101 may be configured to show the image file on its display.

In some embodiments, the PIN and PAN received in step 439 can differ for each consumer that requests to associate the account with a different mobile device. For example, if two consumers (Alice and Bob) both own a joint checking account, and both consumers have associated that joint account with their respective mobile devices (e.g., using the process in FIGS. 4A and 4B), payment network 109 stores two separate alias PANs and PINs to reference the same account, and each owner will have a different PIN and a different alias PAN on their respective mobile device. This enables both consumers to utilize their respective mobile device to access the same account.

Figure 4C:
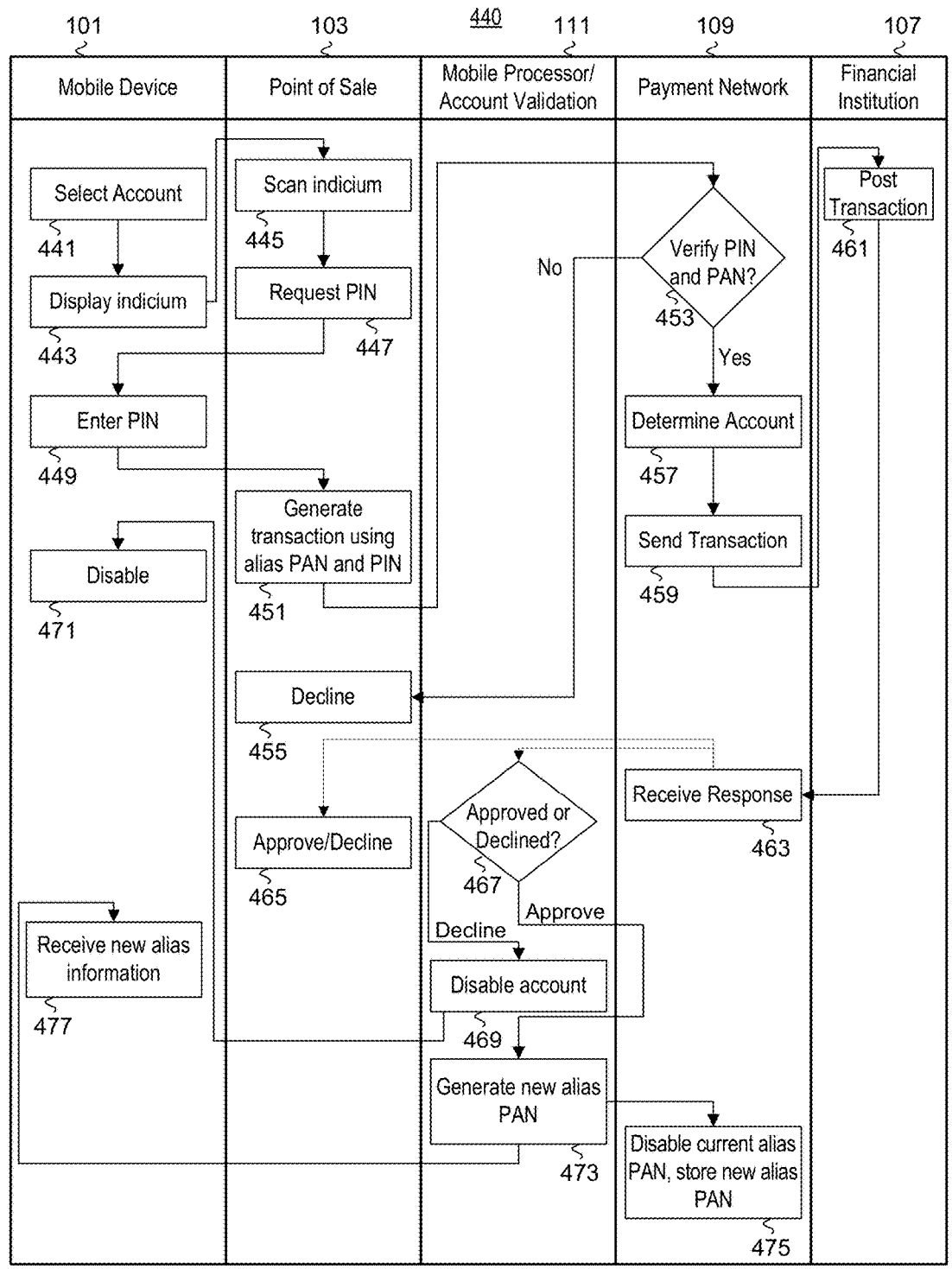
FIG. 4C illustrates an example process flow for processing a payment transaction using a mobile device, useful for implementing embodiments consistent with this disclosure.

FIG. 4C illustrates an example process flow for processing a payment transaction using a mobile device, useful for implementing embodiments consistent with this disclosure. The process illustrated in FIG. 4C begins at step 441, where a consumer selects an account at mobile device 101. For example, a consumer may click on a display on mobile device 101 to select a particular card account, deposit account, checking account, or the like. The process then moves to step 443, where mobile device 101 displays a barcode or other visual indicium on a display of mobile device 101. The indicium represents the alias PAN associated with the account that the consumer wishes to use for payment. The indicium may be represented in such a way as to prevent a human being from reading it, but permit a device, such as a scanner, to read it. (For example, the indicium may be displayed as a barcode, as illustrated in FIG. 3.) The consumer then holds mobile device 101 within visual range of a scanner associated with POS 103.

In step 445, POS 103 scans the visual indicium displayed on mobile device 101 and may determine that the consumer should input a PIN in order to authenticate the transaction. In step 447, POS 103 requests that the consumer enter a PIN. This may be accomplished by transmitting a request to mobile device 101, by displaying the request on a screen visible to the consumer or to a merchant operating POS 103, or the like.

In step 449, the consumer enters the PIN for use by POS 103. In some embodiments, the consumer may enter the PIN on mobile device 101 (for example, using a touchscreen or keypad on mobile device 101). In other embodiments, the consumer may enter the PIN on a keypad connected to POS 103. In still other embodiments, the consumer may verbally tell a merchant operating POS 103 what his PIN is. The process then continues to step 451.

As explained above, in some embodiments, a PIN is not required for all types of accounts. In those embodiments, after operating step 445, the process would proceed to step 451.

In step 451, POS 103 generates a transaction for initiating the payment transaction in step 451. The transaction includes, for example, the alias PAN represented by the visual indicium and, in some embodiments, a PIN provided by the consumer in step 449. POS 103 then sends that transaction to payment network 109. In step 453, payment network 109 receives the transaction and attempts to verify the PAN and PIN. Step 453 represents, for example, payment network 109 determining at least one of whether the received PAN is a valid PAN (e.g., is formatted correctly), determining whether the received PIN is a valid PIN (e.g., is of the correct length), determining that the PAN has not been used for a previous transaction, and determining whether the PAN and the PIN are contained and associated with one another in a database accessible to payment network 109. If payment network 109 determines that there is an issue with one of the PAN or the PIN, payment network 109 may return a message declining the transaction, and POS 103 may receive that message in step 455. POS 103 (or a merchant operating POS 103) may then prompt the consumer using mobile device 101 to attempt the transaction again.

However, if payment network 109 determines that the PAN and PIN are of the correct form and match one another, the process continues to step 457. In step 457, payment network 109 determines an account number associated with the PAN. For example, using the received PAN, payment network 109 can look for an RTN/account number pair or a card number in a database. This enables payment network 109 to generate and send a transaction in step 459 to financial institution 107. The transaction is based on the information in the transaction received in step 453, but instead of including an alias PAN and a PIN, would be initiated using the RTN/account number pair or card number.

Financial institution 107 receives the transaction in step 461 and posts it to the account referenced in the transaction. For example, if the transaction represents a purchase, financial institution 107 may debit the account by the amount referenced in the transaction, and send a message indicating that the transaction was approved. Step 461 also involves determining whether the transaction is able to be posted. For example, if the account does not have enough funds to post the transaction, financial institution 107 may send a message indicating that the transaction was declined.

In step 463, payment network 109 receives the response to the transaction and forwards it to mobile processor/account validation system 111 and to POS 103. In step 465, POS 103 receives the response and indicates to the consumer the result of the transaction, for example, whether it was approved or declined. This may be accomplished by transmitting the result to mobile device 101, by displaying the result on a screen visible to the consumer or to a merchant operating POS 103, or the like. If the transaction is approved, the merchant operating POS 103 may permit the consumer operating mobile device 101 to purchase the item, and if it is declined, the merchant may allow the consumer to attempt the purchase again.

In step 467, mobile processor/account validation system 111 receives the response and determines whether the response indicates that the transaction was approved or declined. If the transaction was declined, mobile processor/account validation system 111 may disable the account in step 469. Disabling the account includes, for example, marking the alias PAN as disabled in database 109A and thus preventing its use by mobile device 101. In step 471, mobile device 101 may disable the alias PAN, preventing it from being displayed on mobile device 101.

However, if mobile processor/account validation system 111 determines that the response indicates that the transaction was approved, process 440 proceeds to step 473. In step 473, mobile processor/account validation system 111 generates a new alias PAN for use with the account. Mobile processor/account validation system 111 then sends the new alias PAN to payment network 109 and mobile device 101.

In step 475, payment network 109 disables the alias PAN used in accomplishing the transaction represented in FIG. 4C and replaces it with the new alias PAN. In some embodiments, payment network 109 removes the use alias PAN from database 109A; however, in other embodiments, payment network 109 marks the used alias PAN as only usable for returning of goods purchased using it.

In step 477, mobile device 101 also receives the new alias PAN. Mobile device 101 can then replace the used alias PAN with the new alias PAN.

Figure 4D:
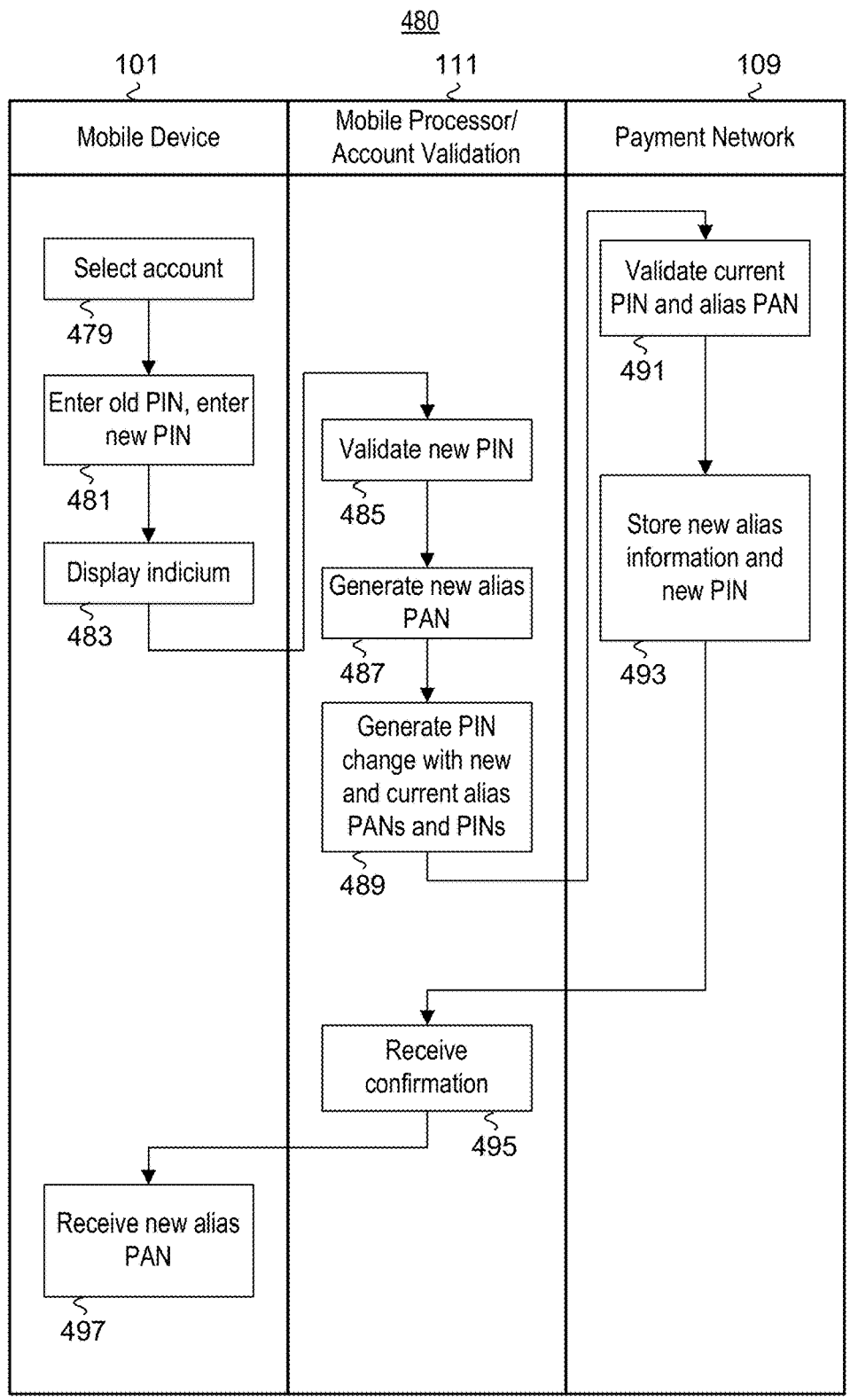
FIG. 4D illustrates an example process flow for enabling the change of a PIN associated with a mobile device, useful for implementing embodiments consistent with this disclosure.

FIG. 4D illustrates an example process flow 480 for enabling the change of a PIN associated with a mobile device 101, useful for implementing embodiments consistent with this disclosure. In step 479, a consumer using mobile device 101 selects an account on the display of mobile device 101. For example, a consumer may click on a display on mobile device 101 to select a particular card account, deposit account, checking account, or the like. The process then moves to step 481, where the consumer enters the current PIN associated with mobile device 101 as well as a desired new PIN. The consumer may enter the current PIN and the new PIN on mobile device 101 or on a website associated with mobile processor/account validation system 111. In either case, mobile processor/account validation system 111 receives the alias information, the new PIN, and the current PIN in step 485. Mobile processor/account validation system 111 then validates the new PIN to determine that it is in compliance with the requirements for PINs. (For example, mobile processor/account validation system 111 may determine whether the new PIN is four digits or greater, does not repeat the same digit more than twice, or the like.)

In step 487, mobile processor/account validation system 111 generates a new alias PAN for use with the account. In step 489, mobile processor/account validation system 111 then generates a PIN change transaction for sending to payment network 109. The PIN change transaction includes, for example, the new PIN, the current PIN, the new alias PAN, and the current alias PAN. Mobile processor/account validation system 111 then sends the PIN change transaction to payment network 109.

In step 491, payment network 109 receives the PIN change transaction and validates the received information. Payment network 109 validates the current PIN and the current alias PAN (e.g., by checking them against database 109A). If this is successful, process 480 continues to step 493, where the new PIN and new alias PAN are added to the database (e.g., database 109A). In some embodiments, the current alias PAN and current PIN are stored for future purposes, such as returns or analysis.

Payment network 109 then forwards a confirmation message to mobile processor/account validation system 111 indicating that the new alias PAN and new PIN were stored in the database. Mobile processor/account validation system 111 then forwards the confirmation to mobile device 101, along with the new alias PAN generated in step 487. Mobile device 101 can then utilize the new alias PAN (received in step 487) and the new selected PIN (entered in step 481) to effect a purchase or other transaction.

Figure 4E:
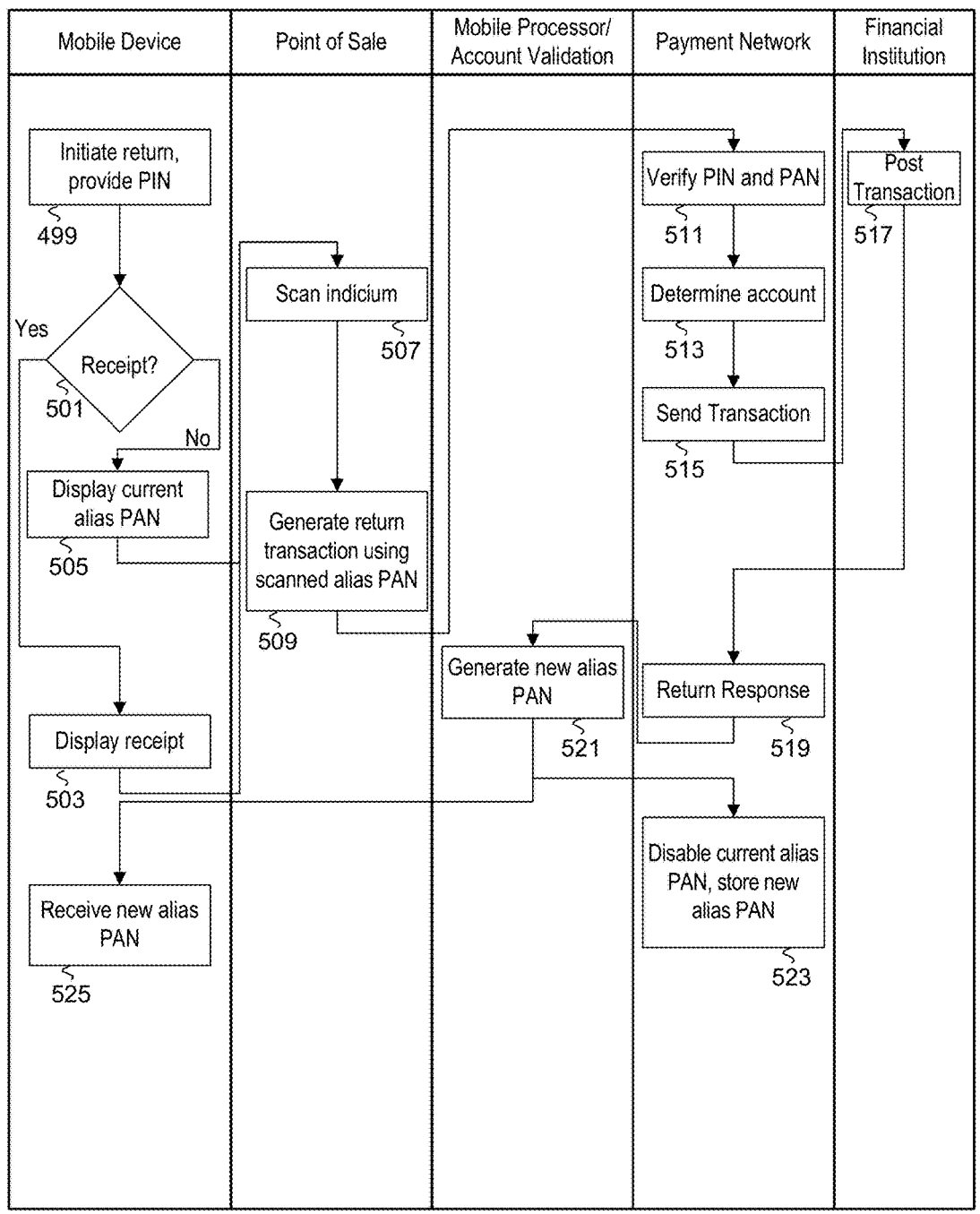
FIG. 4E illustrates an example process flow for processing an adjustment transaction (such as a return) using a mobile device, useful for implementing embodiments consistent with this disclosure.

FIG. 4E illustrates an example process flow for processing an adjustment transaction (such as a return or price adjustment) using a mobile device, useful for implementing embodiments consistent with this disclosure. The process illustrated in FIG. 4E begins at step 499, where a consumer selects an option to initiate a return transaction on mobile device 101. For example, a consumer may click on a display on mobile device 101 to select a return option. In some embodiments, the consumer may have the option of selecting to return or adjust the price of an item for which a receipt exists on mobile device 101, or of selecting to return or adjust the price of an item for which no receipt is available.

The process then moves to step 501. In step 501, based on whether mobile device 101 has a receipt corresponding to the transaction that the consumer wishes to return, one of two steps is taken. If mobile device 101 has a receipt corresponding to that transaction, mobile device 101 displays the receipt and the associated indicium on a display of mobile device 101. The indicium represents the alias PAN associated with the account that the consumer used to effect the transaction represented by the receipt. The indicium may be represented in such a way as to prevent a human being from reading it, but permit a device, such as a scanner, to read it. (For example, the indicium may be displayed as a barcode, as illustrated in FIG. 3.) The consumer then holds mobile device 101 within visual range of a scanner associated with POS 103. However, if there is no receipt corresponding to the transaction, then in step 505, mobile device 101 displays the current alias PAN (that is, the alias PAN that has not yet been used to effect any transactions) on the display.

In either case, POS 103 scans the displayed indicium in step 507 and generates a return transaction in step 509. The return transaction includes, for example, a request to return one or more purchased item(s) (and thus credit the associated account with a refund), a request to adjust the price corresponding to one or more purchased items (and thus credit or debit the account), or the like. The transaction may also include a PIN entered by the consumer using mobile device 101. POS 103 then sends the return transaction to payment network 109. In step 511, if payment network 109 determines that the PAN and PIN are associated with one another, the process continues to step 513.

In step 513, payment network 109 determines an account number associated with the PAN. For example, using the received PAN, payment network 109 can look for an RTN/account number pair or a card number in database 109A. This enables payment network 109 to generate and send a transaction in step 515 to financial institution 107. The transaction is based on the transaction received in step 509, but instead of including an alias PAN and a PIN, would be initiated using the RTN/account number pair or a card number. Financial institution 107 receives the transaction in step 517 and posts it to the account referenced in the transaction. For example, if the transaction represents a return by the consumer, financial institution 107 may credit the account by the amount referenced in the transaction, and send a response indicating that the return was approved.

In step 519, payment network 109 receives the response to the transaction and forwards it to mobile processor/account validation system 111. If mobile processor/account validation system 111 determines that the response indicates that the return transaction was approved, then in step 521, mobile processor/account validation system 111 generates a new alias PAN for use with the account. Mobile processor/account validation system 111 then sends the new alias PAN to payment network 109 and mobile device 101.

In step 523, payment network 109 may disable the alias PAN used in accomplishing the return transaction and replaces it with the new alias PAN. For example, if the current alias PAN is used in the return transaction in step 509, that current alias PAN must be disabled to avoid reuse. In some embodiments, disabling the current alias PAN comprises removing the used alias PAN from database 109A. However, if the alias PAN in the return transaction in step 509 comprises the PAN used in effecting the original purchase (i.e., the one that is returned in process 490), that alias PAN may not necessarily be removed from database 109A.

In step 525, mobile device 101 also receives the new alias PAN. Mobile device 101 can then replace the used alias information with the new alias information. In some embodiments, receiving the new alias PAN also indicates to mobile device 101 that the return transaction was successful.

Figure 5:
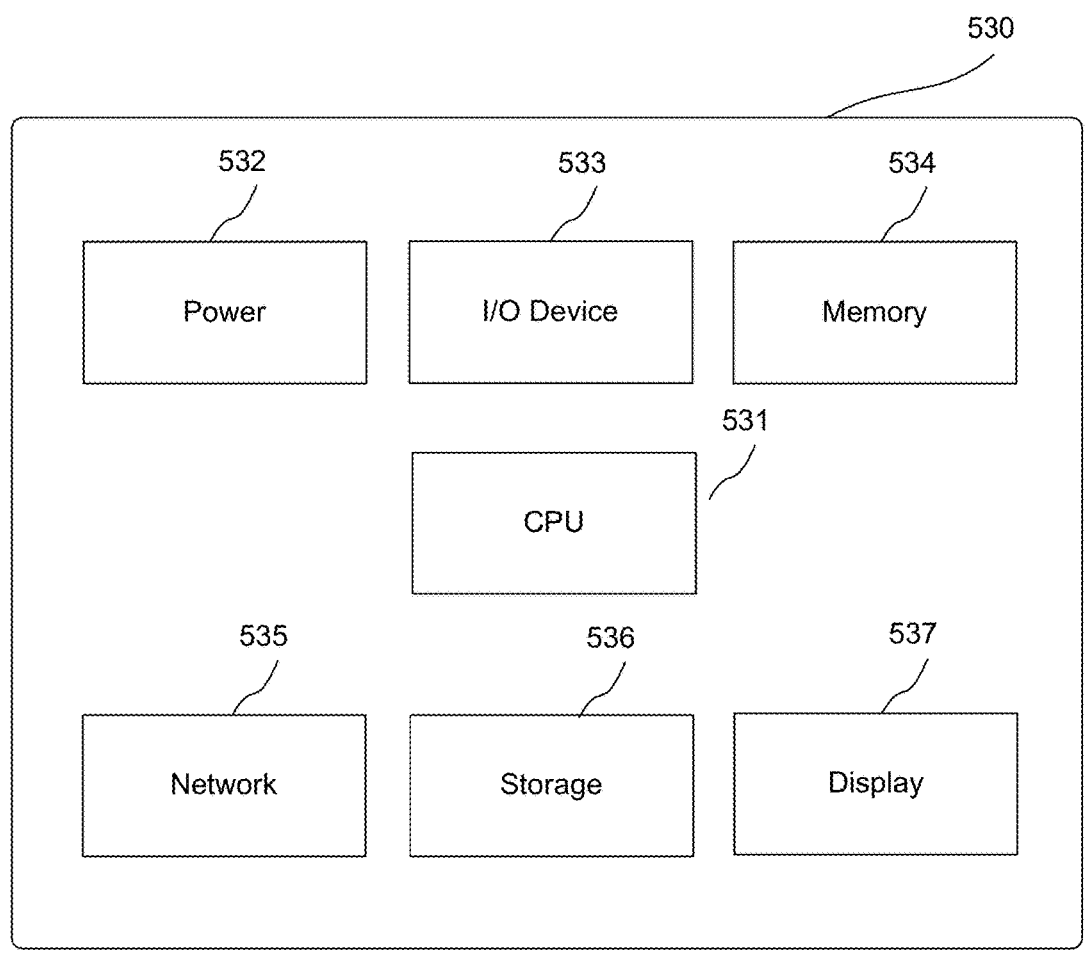
FIG. 5 is an example module diagram for implementing devices that are enabled to implement embodiments consistent with this disclosure.

FIG. 5 depicts an example module diagram 530 for implementing devices that are enabled to implement embodiments consistent with this disclosure.

Device 530 may include a variety of modules such as a central processing unit (CPU) 531, power device 532, input/output device 533, memory 534, network device 535, storage device 536, and display device 537. One of ordinary skill will understand that these modules may be implemented as hardware, firmware, software, or a combination thereof. Additionally, modules in device 530 may be consolidated, duplicated, omitted, or otherwise differ from the particular arrangement in this exemplary figure.

CPU 531 may be implemented as a general purpose processor. CPU 531 may be configured to control the operations of the other components of device 530. This includes, for example, implementing software/firmware/hardware routines, routing and processing data between modules, and establishing connections between modules. In some embodiments, such as those where device 530 implements mobile device 101, CPU 531 may be a mobile processor such as an APPLE A5 microprocessor or a SAMSUNG EXYNOS microprocessor. In other embodiments, such as those where device 530 implements POS 103, financial institution 107A, card issuer 107B, payment network 109, database 109A, or mobile processor/account validation system 111, CPU 531 may be a microprocessor such as an INTEL CORE i7 processor or AMD E-SERIES processor. However, these examples are intended to be illustrative rather than restrictive.

Power device 532 is a device that controls and delivers power to the other modules in device 530. For example, power device 532 could be a battery pack, a solar power system, a power supply, a power supply/charger, or the like.

I/O device 533 may be implemented as one or more devices that enable communication between input devices, output devices, and other components of device 530. For example, I/O device 533 may enable communication between input devices such as a touchscreen sensor, proximity sensor, light sensor, keyboard, microphone, or the like, and output devices such as a display, a speaker, a headphone jack, a vibrating alert device, or the like. I/O device 533 may also enable communication between the various modules illustrated in FIG. 5.

Memory 534 enables short-term storage of information, such as information that may be accessed, stored, or cached temporarily, or that can be erased after the power is turned off. For example, memory 534 can be implemented as Random Access Memory (RAM) or the like. Memory 534 may communicate with other illustrated (or non-illustrated) modules to enable the disclosed embodiments.

Network device 535 may be one or more devices that enable communication with a network. For example, network device 535 may be implemented as a wireless adapter, a cellular adapter, a satellite network adapter, a wired network adapter, an infrared adapter, a Bluetooth adapter, or the like. As one of ordinary skill will understand, multiple types of connections and/or multiple network devices can be used to implement the disclosed embodiments.

Storage device 536 may be implemented as one or more devices for non-volatile storage of information accessible by other components for more than a short amount of time and/or after power is turned off to those components. For example, storage device 536 may be implemented as a hard disk, Read-Only Memory (ROM), flash memory, optical storage, or the like. Storage device 536 may communicate with other illustrated (or non-illustrated) modules to enable the disclosed embodiments.

Display device 537 enables visual display of information processed, received, or stored by device 530. In some embodiments, display device 537 can be implemented as a computer monitor, a pole display, an LED/LCD price display, a receipt printer, an LCD, a LED display, a touchscreen, a non-touchscreen, or the like. One of ordinary skill will recognize that multiple types of displays are possible and can select the types and number of displays appropriately for implementing disclosed embodiments.

One of skill in the art will understand the particular modules that may be duplicated, omitted, modified, or replaced, in implementing these exemplary devices using this exemplary figure.

Other embodiments will be apparent to those skilled in the art from consideration of the specification and practice disclosed herein. It is intended that the specification and examples be considered as exemplary only, with the true scope and spirit being indicated by the following claims.

What is claimed is:

1. A method of processing payment transactions comprising operations performed by a payment network, comprising:
  receiving, from an account validation system, a registration message including account information for at least one account and first alias information, the account information comprising at least one identifier of the account and an associated financial institution, the first alias information indicating the use of the payment network for processing payment transactions;
  in a database, storing the account information for the at least one account and first alias information in association with one another;
  receiving, from a merchant device, a first transaction comprising (1) transaction information and (2) the first alias information, and not including the account information;
  determining, using the database, the account information associated with the first alias information and the associated financial institution;
  sending a transaction request to the determined financial institution, the transaction request comprising at least an identifier of the account and an identifier of the associated financial institution;
  receiving, from the determined financial institution, a response to the transaction request;
  forwarding the response to the merchant device;
  receiving second alias information upon approval of the transaction request, and, responsive thereto, recording the first alias information in the database as used;
  receiving a request for a first adjustment transaction, comprising information about the first adjustment transaction and the first alias information;
  determining whether the first alias information is marked as used in the database;
  in response to determining that the first alias information is used, sending the first adjustment transaction request to the financial institution for processing;
  receiving a communication from the financial institution; and
  sending a second communication to the merchant device indicating approval of the first adjustment transaction in response to receiving a communication from the first financial institution indicating approval of the first adjustment transaction.

2. The method of claim 1, further comprising:
  receiving a request for a second transaction, the second transaction request including the first alias information and information about the second transaction;
  determining, by consulting the database, whether the first alias information is marked as used; and in response to determining that the first alias information is used, sending to the merchant device a communication indicating disapproval of the second transaction request.

3. The method of claim 1, further comprising storing the second alias information in the database, in association with the account information.

4. The method of claim 1, wherein the first adjustment transaction comprises at least one of a refund, a return, or a price adjustment.

5. The method of claim 1, wherein:
the first transaction request comprises a first PIN entered at the merchant device;
the database contains a second PIN associated with the at least one account; and further comprising:
before determining a financial institution, determining whether the second PIN is equal to the first PIN, and if so, proceeding to determine the financial institution.

6. A computer system for processing payment transactions using alias information, the system comprising:
at least one processor; and
a storage device containing instructions, the instructions being configured to cause the at least one processor to perform a method comprising:
receiving, from an account validation system, a registration message including account information for at least one account and first alias information, the account information comprising at least one identifier of the account and an associated financial institution, the first alias information indicating the use of the payment network for processing payment transactions;
in a database, storing the account information for the at least one account and first alias information in association with one another;
receiving, from a merchant device, a first transaction comprising (1) transaction information and (2) the first alias information, and not including the account information;
determining, using the database, (1) the account information associated with the first alias information, and (2) the associated financial institution;
sending a transaction request to the determined financial institution, the transaction request comprising at least an identifier of the account and an identifier of the associated financial institution;
receiving, from the determined financial institution, a response to the transaction request;
forwarding the response to the merchant device;
receiving second alias information upon approval of the transaction request, and, responsive thereto, recording the first alias information as used in the database;
receiving a request for a first adjustment transaction, comprising information about the first adjustment transaction and the first alias information;
determining whether the first alias information is marked as used in the database;
in response to determining that the first alias information is used, sending the first adjustment transaction request to the financial institution for processing;
receiving a communication from the financial institution; and
sending a second communication to the merchant device indicating approval of the first adjustment transaction in response to receiving a communication from the first financial institution indicating approval of the first adjustment transaction.

7. A non-transitory computer-readable medium storing instructions that, when executed by a processor, cause the processor to perform operations comprising:
receiving, from an account validation system, a registration message including account information for at least one account and first alias information, the account information comprising at least one identifier of the account and an associated financial institution, the first alias information indicating the use of the payment network for processing payment transactions;
in a database, storing the account information for the at least one account and first alias information in association with one another;
receiving, from a merchant device, a first transaction comprising (1) transaction information and (2) the first alias information, and not including the account information;
determining, using the database, (1) the account information associated with the first alias information, and (2) the associated financial institution;
sending a transaction request to the determined financial institution, the transaction request comprising at least an identifier of the account and an identifier of the associated financial institution;
receiving, from the determined financial institution, a response to the transaction request;
forwarding the response to the merchant device;
receiving second alias information upon approval of the transaction request, and, responsive thereto, recording the first alias information as used in the database;
receiving a request for a first adjustment transaction, comprising information about the first adjustment transaction and the first alias information;
determining whether the first alias information is marked as used in the database;
in response to determining that the first alias information is used, sending the first adjustment transaction request to the financial institution for processing;
receiving a communication from the financial institution; and
sending a second communication to the merchant device indicating approval of the first adjustment transaction in response to receiving a communication from the first financial institution indicating approval of the first adjustment transaction.

* * * * *